Figure 1:
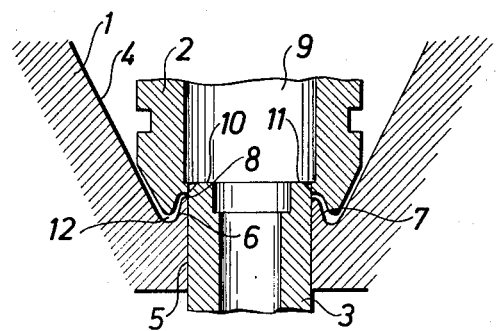

United States Patent
Ignell

[15] 3,680,996
[45] Aug. 1, 1972

[54] APPARATUS FOR MOULDING A CONTAINER COMPONENT

[72] Inventor: Rolf Lennart Ignell, Lund, Sweden
[73] Assignee: Sobrefina SA, Fribourg, Sweden
[22] Filed: Sept. 15, 1970
[21] Appl. No.: 72,266

[30] Foreign Application Priority Data
Sept. 17, 1969 Sweden.....................12807/69

[52] U.S. Cl.................................425/292, 425/298
[51] Int. Cl. ..........................B29c 3/00, B29c 17/10
[58] Field of Search..18/34 R, 35, 16.5, 19 BC, 19 BE, 18/19 P, 19 R, 42 R, DIG. 41, 35, 6, 5 BZ; 264/159; 425/290, 292, 298

[56] References Cited

UNITED STATES PATENTS

| | | | |
|---|---|---|---|
| 1,793,603 | 2/1931 | Frederick | 18/35 |
| 2,684,502 | 7/1954 | Paulve | 18/42 R UX |
| 3,241,193 | 3/1966 | Pohlman | 18/42 R |
| 2,118,080 | 5/1938 | Goodwin | 18/42 R |
| 2,268,865 | 6/1942 | Martin | 18/35 |
| 3,032,824 | 5/1962 | Proud | 18/DIG. 41 |

*Primary Examiner*—Robert L. Spicer, Jr.
*Attorney*—Pierce, Scheffler & Parker

[57] ABSTRACT

Apparatus for moulding and shaping the opening of a container in which a cap is inserted in such a fashion that a portion thereof is gripped by and embraces a particularly smooth and polished portion of the neck of the container to form an air-tight seal.

3 Claims, 3 Drawing Figures

APPARATUS FOR MOULDING A CONTAINER COMPONENT

This invention relates to equipment for molding a container component from plastic material capable of being heat formed, and for making an opening in the molded container component, which opening exhibits a cylindrical portion of a high degree of surface smoothness which is to serve as the sealing surface for a cap placed in the opening Within packaging technology, glass material has lately been replaced by plastic material in e.g. bottle-shaped containers of the type which are provided with an opening and a cap which can be placed in the opening so as to form a seal. It has been found that the capping devices traditionally used in conjunction with glass bottles are not suitable for use on the new plastic bottles, partly because many of the known capping devices require such a high capping pressure that the plastic bottles can barely withstand this without being deformed, and partly because the flexibility of the plastic material may give rise to leakage in conjunction with the use of these known capping devices if these caps are applied to a plastic bottle which later on during transport and handling may be subjected to lateral or flexural forces in the vicinity of the region of lixity of the cap, resulting in deformation of the wall of the bottle.

It has been found possible instead, by making use of the flexibility of the plastic material, to produce simple and inexpensive capping devices in the shape of plastic stoppers which can be pressed into the opening of the plastic bottles. These capping stoppers are in general provided with sealing flanges which with the aid of the resilience of the material of the cap and/or of the bottle are pressed against the opening of the bottle in order to produce a seal.

When plastic bottles of the above kind are designed for liquids under pressure, e.g. beer, the problem of providing a seal is naturally of considerable importance, and we have been successful in achieving a very good sealing effect with the aid of a cap of the above type by providing the opening of the bottle with a cylindrical portion of a high degree of surface smoothness, against which portion the sealing flanges situated on the cap are pressed. It is known how to produce an opening with a cylindrical portion of a high degree of surface smoothness by carrying out the stamping operation with a tool whose side surfaces have been polished. Stamping, which is as a rule carried out in conjunction with the molding operation, i.e. while the plastic material is still warm and plastic, has the result that the plunger, when it has passed through the plastic material with its polished surface, causes the material in the portion stamped out to be cast, with the result that surface irregularities produced during the stamping operation are smoothed out. It has been found however that such plungers easily form outward-directed flashes after being used for some time, which when the plunger is returned give rise to scratches in the polished portion of the opening, with leakage problems as a result. These drawbacks are avoided by this invention, which relates to equipment characterized by a mold constituting a molding cavity, a die and a plunger, whereby (a) the die and the plunger are capable of movement relative to one another, (b) the die and parts of the molding cavity are designed to form between them a molding space in which the opening is to be molded, (c) the plunger which is designed to stamp out a round disc against the cutting edge of the die has an effective stamping diameter that is less than the diameter of the said cylindrical portion.

Figure 2:
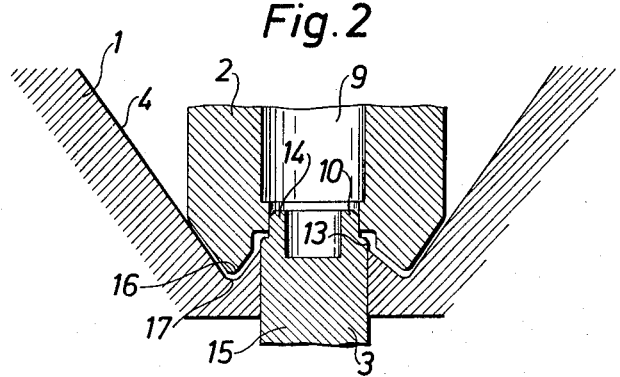
Figure 3:
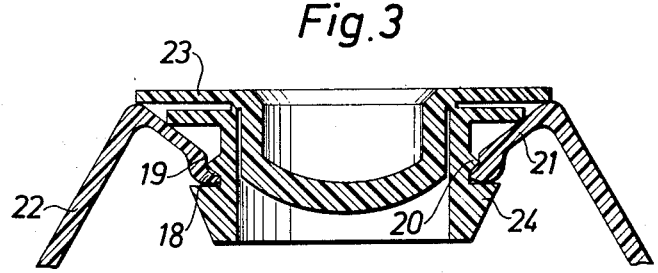

Two constructional versions of the invention will be described below by reference to the attached diagrammatic drawing, in which FIG. 1 shows a molding equipment in which casting of the polished portion is effected against a flange situated on the mold;

FIG. 2 shows a molding equipment in which the polished portion of the opening is cast against a part joined to the plunger; and FIG. 3 shows an opening produced with the aid of the equipment in accordance with the invention, as well as a stopper inserted into the opening.

The equipment shown in FIG. 1 consists of a mold (1), the molding surface (4) of which has a conical shape. The equipment also has a die (2) which is capable of axial movement in relation to the mold (1), and a plunger (3) which is capable of axial movement in a hole (5) through the mold (1). The die (2) and the plunger (3) are capable of movement in relation to one another and to the mold (1).

The forward edge (10) of the plunger (3) is designed to punch holes, against the cutting edge (11) of the die (2), in a plastic blank which has been affixed and molded between the mold (1) and the die (2). The mold (1) is further provided with a flange (6), the surface (7) of which that is facing the molding cavity is polished to a high degree of surface smoothness.

The procedure during the stamping operation is that the blank of material capable of being heat formed, which has been heated to plasticity, is pressed by the die (2) into the molding cavity defined by the mold (1), whereby the plastic material is stretched and is caused by the application of pressure to adhere closely to the conical surface (4) of the mold (1). By virtue of the fact that the die (2) is pressed against the mold (1), the plastic material situated in the space (12) between the two parts is pressure molded to form an opening exhibiting an inward-turned lip. As a result of the fact that the surface (7) of the flange (6) is thoroughly polished and has been given a cylindrical shape, a portion of the inside of the inward-turned lip of the molded opening is given a corresponding shape and surface smoothness, by virtue of the heated plastic material being cast against the polished surface (7).

When molding of the opening has been completed by the die (2) being brought to its end position, a round disc is stamped out of the molded opening by the plunger (3) being raised and with its cutting edge (10) punching through the plastic material against the cutting edge (11) of the die. The punched-out round plastic discs can be blown or sucked out through the space (9). As will be seen in FIG. 1, the diameter of the cylindrical surface (7) is larger than that of the punched-out round discs. The polished surface (7) will not therefore be scratched when the plunger is returned to its original position, even if there are flashes along the cutting edge (10) of the punching tool (3).

FIG. 2 shows a variant of the equipment in accordance with the invention. in this variant, as in the equipment in FIG. 1, the die (2) and the plunger (3) are capable of movement relative to one another and to the mold (1). Instead of providing the mold (1) with a flange (6), the plunger (3) has been made in such a way that it consists of a forward part (14) of smaller diameter and a rear part (15) of larger diameter. At the change-over portion between the forward part (14) and the rear part (15), there is a molding surface against which parts of the molded opening are to be cast. The said molding surface, in addition to a rounded portion, also includes a cylindrical portion (13) whose surface is thoroughly polished.

Molding of a container top and the opening which forms part of this takes place in a way analogous to that described in connection with FIG. 1. A plastic blank heated up to plasticity, in the form of a sheet or strip, is fed into the molding equipment (1) with the aid of the die (2), whereby the plastic material is stretched and is made to adhere closely to the inner molding surface (4) of the mold (1). The plastic material is pressed with the aid of the die (2) against the central part of the mold (1), whereby the plastic material is pressure molded to the desired shape, i.e. it is made to assume the shape defined between the molding surface (16) of the die (2) and the molding surface (17) of the mold (1).

In conjunction with the stamping out of the opening, which is effected by the plunger (3) being raised whereupon its cutting edge (10) stamps out from the plastic blank a round disc which is removed through the space (9), the molding surface (13) of the plunger (3) is pressed against the edge zone of the opening produced. By virtue of the fact that the plunger (3) is pressed forward with a large force, the plastic material is pressure molded and is cast around the polished cylindrical surface (13) at the rear of the plunger.

In this case also, there are no scratches formed on the cast cylindrical surface of the opening when the plunger (3) is returned, since the plunger diameter is less than the diameter of the said cylindrical portion.

FIG. 3 shows an opening produced by equipment in accordance with the invention and also a cap of known type inserted into the opening. The opening shown in FIG. 3 consists of a container top (22) with an inward-turned lip (21). At the forward edge of the said inward-turned lip (21), there is a cylindrical sealing surface (19) which has a high degree of surface smoothness. Below the said sealing surface (19) projects a ring-shaped flange (18) which defines the actual opening. The cap consists of a disc (23) and a flange (24) between which the inward-turned lip (21) is flexibly affixed. The cap further exhibits a sealing flange (20) of triangular section. When the cap is pressed into the opening of the container, the forward edge of the sealing flange (20) owing to the elastic properties of the material, is pressed against the cylindrical sealing surface (19), and since the said sealing surface has a very high degree of surface smoothness and the sealing flange (20) is slightly deformed elastically under pressure, a very good seal is obtained.

I claim:

1. Apparatus for providing a container component of thermoplastic material with an opening having a cylindrical polished portion for receiving a cap member to engage the cylindrical portion to form a seal therewith, said apparatus comprising a mould, a die movable axially with respect thereto and a plunger movable axially with respect to both said mould and said die, said mould and said die being provided with cooperating moulding surfaces, which, with said plunger, provide the container component with an inwardly turned lip having an outer polished-like surface portion provided adjacent the inner edge thereof for engagement with a cap member and said plunger adapted to cooperate with said die to stamp a central circular disc out of said container component to form an opening concentric with and having a diameter smaller than the diameter of the polished-like cylindrical portion of the container component with which the cap engages, whereby said plunger may be removed from the container component without contacting the outer polished-like portion of the inwardly turned lip of the container component.

2. Apparatus as claimed in claim 1 wherein the moulding surface of said mould is provided with a polished cylindrical surface.

3. Apparatus as claimed in claim 1 wherein the plunger is provided with an enlarged portion spaced from the end thereof, said enlarged portion being provided with a polished cylindrical surface.

* * * * *